US012794024B2

(12) United States Patent
Soon

(10) Patent No.: US 12,794,024 B2
(45) Date of Patent: Nov. 10, 2026

(54) LITHIUM METAL BATTERY AND MANUFACTURING METHOD THEREOF

(71) Applicant: LG ENERGY SOLUTION, LTD., Seoul (KR)

(72) Inventor: Jiyong Soon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 715 days.

(21) Appl. No.: 17/762,662

(22) PCT Filed: Oct. 21, 2020

(86) PCT No.: PCT/KR2020/014369
§ 371 (c)(1),
(2) Date: Mar. 22, 2022

(87) PCT Pub. No.: WO2021/132863
PCT Pub. Date: Jul. 1, 2021

(65) Prior Publication Data

US 2022/0393256 A1 Dec. 8, 2022

(30) Foreign Application Priority Data

Dec. 23, 2019 (KR) ........................ 10-2019-0173083
Oct. 20, 2020 (KR) ........................ 10-2020-0135962

(51) Int. Cl.

| | |
|---|---|
| ***H01M 10/052*** | (2010.01) |
| ***H01M 4/02*** | (2006.01) |
| ***H01M 4/131*** | (2010.01) |
| ***H01M 4/134*** | (2010.01) |
| ***H01M 4/1391*** | (2010.01) |
| ***H01M 4/36*** | (2006.01) |
| ***H01M 4/38*** | (2006.01) |
| ***H01M 4/505*** | (2010.01) |
| ***H01M 4/525*** | (2010.01) |
| ***H01M 4/62*** | (2006.01) |
| ***H01M 10/0568*** | (2010.01) |
| ***H01M 10/42*** | (2006.01) |
| ***H01M 50/403*** | (2021.01) |
| ***H01M 50/414*** | (2021.01) |
| ***H01M 50/431*** | (2021.01) |
| ***H01M 50/446*** | (2021.01) |
| ***H01M 50/449*** | (2021.01) |

(52) U.S. Cl.
CPC ....... *H01M 10/4235* (2013.01); *H01M 4/131* (2013.01); *H01M 4/134* (2013.01); *H01M 4/1391* (2013.01); *H01M 4/366* (2013.01); *H01M 4/382* (2013.01); *H01M 4/505* (2013.01); *H01M 4/525* (2013.01); *H01M 4/622* (2013.01); *H01M 10/052* (2013.01); *H01M 10/0568* (2013.01); *H01M 50/403* (2021.01); *H01M 50/414* (2021.01); *H01M 50/431* (2021.01); *H01M 50/446* (2021.01); *H01M 50/449* (2021.01); *H01M 2004/021* (2013.01); *H01M 2004/027* (2013.01); *H01M 2004/028* (2013.01); *H01M 2300/0025* (2013.01)

(58) Field of Classification Search
CPC ........... H01M 4/02; H01M 4/04–0404; H01M 4/13–134; H01M 4/139–1391; H01M 4/36; H01M 4/362; H01M 4/366; H01M 4/50–505; H01M 4/62–622; H01M 4/628; H01M 10/05–0525; H01M 10/0564; H01M 10/0566; H01M 10/0568; H01M 50/40; H01M 50/403–409; H01M 50/431; H01M 50/446; H01M 50/449–451; H01M 50/471–483; H01M 50/489; H01M 4/382; H01M 10/42; H01M 10/4235; H01M 50/414
See application file for complete search history.

(56) References Cited

U.S. PATENT DOCUMENTS

| | | | | |
|---|---|---|---|---|
| 2003/0190530 | A1* | 10/2003 | Yang ................ | H01M 10/0567 429/339 |
| 2009/0053600 | A1 | 2/2009 | Battat | |
| 2011/0250494 | A1 | 10/2011 | Nomura et al. | |
| 2011/0294019 | A1* | 12/2011 | Amine ............. | H01M 10/0567 429/188 |
| 2014/0349182 | A1 | 11/2014 | O'Neill et al. | |
| 2015/0086853 | A1 | 3/2015 | Matsuno et al. | |
| 2017/0365854 | A1* | 12/2017 | Gopalakrishnannair ................... | H01M 50/457 |

(Continued)

FOREIGN PATENT DOCUMENTS

| | | | | |
|---|---|---|---|---|
| CN | 104064713 A | | 9/2014 | |
| CN | 106876778 A | * | 6/2017 | ........... H01M 4/364 |
| CN | 109742403 A | | 5/2019 | |

(Continued)

OTHER PUBLICATIONS

Machine translation of Kamiyama et al., JP 2014-179206. Originally available Sep. 25, 2014. (Year: 2014).*

(Continued)

*Primary Examiner* — Nicole M. Buie-Hatcher
*Assistant Examiner* — Jacob Buchanan
(74) *Attorney, Agent, or Firm* — Morgan, Lewis & Bockius LLP

(57) ABSTRACT

The present disclosure relates to a lithium metal battery that can easily and effectively remove water and hydrofluoric acid, thereby suppressing a decrease in cell performance and lifespan characteristics or an increase in the internal pressure due to the water and hydrofluoric acid, etc., and a method for manufacturing the same.

11 Claims, No Drawings

(56) References Cited

U.S. PATENT DOCUMENTS

2019/0348668 A1 11/2019 Kim et al.

FOREIGN PATENT DOCUMENTS

| | | | |
|---|---|---|---|
| JP | H10-214640 | A | 8/1998 |
| JP | 2004-47416 | A | 2/2004 |
| JP | 2014-179206 | A | 9/2014 |
| JP | 2017-168323 | A | 9/2017 |
| KR | 10-0125149 | B1 | 12/1997 |
| KR | 10-0795305 | B1 | 1/2008 |
| KR | 10-2009-0076277 | A | 7/2009 |
| KR | 10-2015-0076903 | A | 7/2015 |
| KR | 10-2016-0112665 | A | 9/2016 |
| KR | 10-2018-0035977 | A | 4/2018 |
| KR | 10-1936517 | B1 | 1/2019 |
| KR | 10-2019-0024308 | A | 3/2019 |
| KR | 10-2019-0048524 | A | 5/2019 |
| WO | 2007/021932 | A1 | 2/2007 |
| WO | 2013/125167 | A1 | 8/2013 |

OTHER PUBLICATIONS

Machine translation of Song et al., CN 106876778. Originally available Jun. 20, 2017. (Year: 2017).*

International Search Report (with partial translation) and Written Opinion issued in corresponding International Patent Application No. PCT/KR2020/014369, dated Feb. 1, 2021.

Soon et al., "Copper Oxide as a Hydrogen Fluoride Scavenger for High-Voltage LiNi 0.5 Mn 1.5 O 4 Positive Electrode", Journal of The Electrochemical Society, vol. 164, No. 12, A2677-2682, 2017.

Fuller et al., "Simulation and Optimization of the Dual Lithium Ion Insertion Cell", 1994, J. Electrochem. Soc. 141:1.

Extended European Search Report issued Mar. 19, 2024 for European Patent Application No. 20907337.8.

* cited by examiner

LITHIUM METAL BATTERY AND MANUFACTURING METHOD THEREOF

CROSS CITATION WITH RELATED APPLICATION(S)

This application claims the benefit of Korean Patent Application No. 10-2019-0172498 filed on Dec. 20, 2019 and Korean Patent Application No. 10-2020-0135962 filed on Oct. 20, 2020 in the Korean Intellectual Property Office, each of which is incorporated herein by reference in its entirety.

TECHNICAL FIELD

The present disclosure relates to a lithium metal battery and a method for manufacturing the same, and more particularly to a lithium metal battery that can easily and effectively remove water and hydrofluoric acid, thereby suppressing a decrease in cell performance and lifespan characteristics or an increase in internal pressure due to the water and hydrofluoric acid, etc., and a method for manufacturing the same.

BACKGROUND

A lithium metal battery is a battery to which a negative electrode active material made of a lithium metal (Li-metal) material is applied, and has the advantage of having a theoretically very high energy density and capacity as compared with the conventionally used batteries to which a graphite-based or lithium alloy-based negative electrode is applied. Therefore, research and development on the lithium metal batteries are ongoing in an attempt to apply them to batteries that require high energy density.

However, the lithium metal battery has the disadvantage that it is highly reactive to water and thus has low processability. Therefore, when a cell is produced using lithium metal, it is necessary to manufacture the cell in a situation where a high level of dehumidification is performed.

Further, if water is present inside the cell, lithium metal and the coating film component formed on the surface of the lithium metal can be decomposed by easily reacting with water. In addition, acid components such as hydrofluoric acid formed by the reaction of the water and the fluorine-containing lithium salt contained in the electrolyte may also be decomposed by reacting with the lithium metal and the coating film formed on the lithium metal. This may not only degrade the performance or life characteristics of the cell, but also due to the decomposition reaction caused by water and/or acid components such as hydrofluoric acid, gas components such as hydrogen or carbon dioxide can be generated inside the cell to increase the internal pressure of the cell, which may cause problems with cell safety.

In particular, these various problems can similarly occur even when high dehumidification levels are maintained during the cell manufacturing process, when a small amount of water is contained in a pouch, a separator, or an electrolyte, or when acid components such as hydrofluoric acid is generated due to electrochemical oxidation/decomposition of the electrolyte during charging on the positive electrode surface.

Therefore, in order to solve the problems caused by water or acid components such as hydrofluoric acid, a method of separately adding a moisture removing agent and an acid component such as hydrofluoric acid as an electrolyte additive was mainly applied. However, when these additives are separately added to the electrolyte, since a plurality of additives must be added to the electrolyte separately, there was a disadvantage that the processability and economic efficiency of the entire cell are greatly deteriorated. Furthermore, when the electrolyte additive is added, it is difficult to find an electrochemically stable additive in the entire charge/discharge region, and thus, the additive is oxidized or reduced during the charge/discharge process and may not properly function as a removing agent.

Consequently, until now, in a lithium metal battery, the problem of deterioration of cell performance, life characteristics, and safety due to water and acid components such as hydrofluoric acid has not been properly solved.

Technical Problem

Accordingly, the present disclosure provides a lithium metal battery that can easily and effectively remove water and hydrofluoric acid, thereby suppressing a decrease in cell performance and lifespan characteristics or an increase in the internal pressure due to the water and hydrofluoric acid, etc., and a method for manufacturing the same.

Technical Solution

The present disclosure provides a lithium metal battery comprising:

a positive electrode including a positive electrode current collector and a positive electrode active material layer formed on the positive electrode current collector;

a negative electrode including a negative electrode current collector and a lithium metal (Li-metal) thin film formed on the negative electrode current collector; and a separator interposed between the positive electrode and the negative electrode; and an electrolyte, wherein the positive electrode and the separator are in contact with each other on at least one surface, and the lithium metal battery further includes a copper oxide (CuO) layer coated on one surface of the positive electrode and the separator in which they are in contact with each other.

In addition, the present disclosure provides a method for manufacturing a lithium metal battery, comprising the steps of:

forming a positive electrode having a positive electrode active material layer formed on a positive electrode current collector;

forming a battery assembly including the positive electrode, a negative electrode containing a lithium metal (Li-metal) thin film disposed on a negative electrode current collector, and a separator interposed between the positive electrode and the negative electrode; and injecting an electrolyte into the battery assembly, and further comprising a step of forming a copper oxide layer on one surface of the positive electrode or one surface of the separator in contact with each other.

Advantageous Effects

According to the present disclosure, water and acid components such as hydrofluoric acid inside the cell of a lithium metal battery can be removed very effectively at the same time by a very simple method of adding a layer of copper oxide (CuO) to the contact surface of the positive electrode or separator.

In particular, since the copper oxide is electrochemically stable even in the charge/discharge region of a lithium metal battery, specifically in a high voltage region of up to 5.44 V, the water and acid components can be effectively removed without reduction in the entire charge/discharge region.

As a result, the water and acid components can be effectively removed by a very simplified method compared to the existing one, thereby suppressing deterioration in performance or life characteristics and safety of lithium metal batteries.

DETAILED DESCRIPTION OF THE EMBODIMENTS

Throughout the specification, when a part is referred to as "including" a certain component, it means that the component may further include other components, without excluding the other components, unless otherwise stated. The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. The term "a step of doing something" or "a step of something" used throughout this specification does not mean a step for something.

Throughout the specification, the term "combinations of" included in Markush type description means mixture or combination of one or more selected from a group consisting of components described in Markush type and thereby means that the disclosure includes one or more selected from the Markush group.

Based on the above definition, embodiments of the present disclosure will be described in detail. However, these embodiments are presented for illustrative purposes only, and the present disclosure is not limited thereby, and the present disclosure is only defined by the claims described below.

According to an embodiment of the present disclosure, there is provided a lithium metal battery comprising:

- a positive electrode including a positive electrode current collector and a positive electrode active material layer formed on the positive electrode current collector;
- a negative electrode including a negative electrode current collector and a lithium metal (Li-metal) thin film formed on the negative electrode current collector; and
- a separator interposed between the positive electrode and the negative electrode; and an electrolyte,
- wherein the positive electrode and the separator are in contact with each other on at least one surface, and the lithium metal battery further includes a copper oxide (CuO) layer coated on one surface of the positive electrode and the separator in which they are in contact with each other.

A lithium metal battery according to one embodiment includes a copper oxide (CuO) layer coated and formed on contact surfaces of a positive electrode or a separator in contact with each other. Such copper oxide is a relatively strong basic component and can form chemically stable copper fluoride ($CuF_2$) by an acid-base reaction with an acid component such as hydrofluoric acid. Such copper fluoride can form a hydrate of copper fluoride by reacting with water.

Therefore, even if only a single layer of the copper oxide layer is added, the lithium metal battery of one embodiment can remove water and acid components such as hydrofluoric acid inside the cell of the lithium metal battery very effectively at the same time. As can be seen in Experimental Examples described later, even when compared with other components such as silica, which were mainly considered as conventional moisture removing component, it was confirmed that the copper oxide layer can very effectively remove water and acid components inside the cell of a lithium metal battery.

Furthermore, it was confirmed that as such a copper oxide layer is formed on the contact surface of the positive electrode and the separator, water and acid components present or generated in the entire cell can be removed very effectively compared to the case where copper oxide is included in the positive electrode or included as an electrolyte additive.

In particular, since the copper oxide is electrochemically stable even in the charge/discharge region of a lithium metal battery, specifically in a high voltage region of up to 5.44 V, the water and acid components can be effectively removed without being reduced in the entire charge/discharge region.

Unlike this, as also confirmed through Comparative Examples described later, when the copper oxide is included in the positive electrode, or when other components such as silica different from the copper oxide are used, the removal efficiency of the acid component such as hydrofluoric acid was found to be insufficient.

Further, when the copper oxide is included as an electrolyte additive or is present on the negative electrode surface, the copper oxide may be reduced on the negative electrode surface during the charging process of the battery as shown in the following Reaction Scheme.

$$CuO+2Li^{+}+2e^{-}\rightarrow Cu+Li_2O \text{ (1.4V vs Li/Li}^{+}\text{)} \quad \text{[Reaction Scheme]}$$

As a result of this reduction reaction, copper oxide can be converted to copper metal and lithium oxide, and electrodeposited on the negative electrode, which can act as a side reaction and cause low coulombic efficiency of the cell. Therefore, the electrolyte additive or the copper oxide formed on the negative electrode surface cannot properly remove acid components such as hydrofluoric acid, water, and the like.

Unlike this, the lithium metal battery of one embodiment can remove water and acid components such as hydrofluoric acid inside the cell of the lithium metal battery very effectively at the same time by a very simple method of adding a copper oxide (CuO) layer to the contact surface of the positive electrode or the separator. As a result, it is possible to effectively remove the water and acid components by a very simplified method compared to the existing ones, thereby suppressing deterioration of the performance and lifespan characteristics of the lithium metal battery and deterioration of safety such as an increase in internal pressure.

Hereinafter, a lithium metal battery according to an embodiment of the present disclosure will be described in more detail.

In the lithium metal battery according to the embodiment described above, the electrolyte may include a fluorine-containing lithium salt, and may further include a copper fluoride ($CuF_2$) or a hydrate thereof formed on the copper oxide layer.

As described in more detail below, a lithium metal battery generally contains a fluorine-containing lithium salt as an electrolyte. Acid components such as hydrofluoric acid are formed by the reaction of the electrolyte and water, and these acid components can cause deterioration of the cell performance and lifetime characteristics or safety. However, in the lithium metal battery of one embodiment, the copper oxide layer may react with an acid component to form copper fluoride, and this copper fluoride can react with water to form hydrates.

Therefore, the lithium metal battery of one embodiment may further include a copper oxide layer, for example, copper fluoride or a hydrate thereof formed on at least one surface of the copper oxide layer. By the formation mechanism of the copper fluoride, the acid component and the water can be removed together, and the cell performance, life characteristics and safety of the lithium metal battery can be maintained excellently. Further, the copper oxide layer may be coated and formed on at least one surface of the positive electrode and/or separator in contact with each other so as to have a thickness of 1 to 10 μm, or 2 to 6 μm. Thereby, the action of the copper oxide layer makes it possible to more effectively remove water and acid components such as hydrofluoric acid inside the cell, and to suppress the deterioration of the cell capacity characteristics or the like due to the copper oxide layer.

Further, the copper oxide layer may further include a polymer binder such that the copper oxide is uniformly dispersed to better coat and form on at least one surface of the positive electrode and/or the separator. The type of such a polymer binder is not particularly limited, but suitably, any binder, which is known to be usable for a positive electrode or the like described later, for example, a polyvinylidene fluoride (PVDF)-based polymer binder, may be used.

Further, the method of forming the above-mentioned copper oxide layer is not particularly limited, and can be formed according to a general method of coating and forming an inorganic oxide layer. For example, the copper oxide layer may be formed to have the above-described thickness through a method in which copper oxide is mixed with the above-mentioned polymer binder, dissolved or dispersed in an organic solvent for forming a positive electrode, and this organic solution is coated and dried on a positive electrode active material layer or one surface of a separator in the same manner as the positive electrode mixture for forming the positive electrode active material layer.

A copper oxide layer is formed on one surface of the positive electrode and/or one surface of the separator by such a method, and a positive electrode, a negative electrode containing a lithium metal thin film, and a separator interposed between the positive electrode and the negative electrode are laminated by a general method to form a battery assembly, and then an electrolyte is injected into such battery assembly. Thereby, the lithium metal battery of one embodiment may be manufactured.

However, the lithium metal battery of one embodiment may follow the typical configuration and manufacturing method of a lithium metal battery, except that the above-mentioned copper oxide layer is coated and formed on one surface of a positive electrode and/or a separator in contact with each other. Hereinafter, an additional configuration of such a lithium metal battery will be described.

The electrolyte of the lithium metal battery may be a liquid electrolyte (that is, an electrolyte) or a solid electrolyte.

When the electrolyte of the lithium metal battery is a liquid electrolyte, it may include a non-aqueous organic solvent and a lithium salt.

The non-aqueous organic solvent serves as a medium through which ions involved in the electrochemical reaction of the battery can move.

The type of the non-aqueous organic solvent is not particularly limited, and an ether-based solvent, a carbonate-based solvent, an ester-based solvent, a ketone-based solvent, an alcohol-based solvent, or aprotic solvent may be used. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like, and the ester-based solvent may include methyl acetate, ethyl acetate, n-propyl acetate, 1,1-dimethylethyl acetate, methyl propionate, ethyl propionate, γ-butyrolactone, decanolide, valerolactone, mevalonolactone, caprolactone, and the like. The ether-based solvent may include dimethyl ether, 1,2-dimethoxyethane, dibutyl ether, tetraglyme, diglyme, 2-methyltetrahydrofuran, tetrahydrofuran, and the like, and the ketone-based solvent may include cyclohexanone, and the like. In addition, the alcohol-based solvent may include ethyl alcohol, isopropyl alcohol, and the like, and the aprotic solvent may include nitriles such as R—CN (where R is a C2 to C20 linear, branched or cyclic hydrocarbon group, which may include a double bonded aromatic ring or an ether bond), amides such as dimethylformamide, dioxolanes such as 1,3-dioxolane, sulfolanes, and the like. Among these, from the viewpoint of improving the life characteristics of a lithium metal battery, a carbonate-based solvent or an ether-based solvent can be appropriately used.

Further, the non-aqueous organic solvent may be used alone or in combination of two or more. The mixing ratio when one or more non-aqueous organic solvents are mixed and used can be appropriately adjusted according to the desired battery performance, which may be widely understood by those worked in the art.

Further, when the carbonate-based solvent is used, it is favorable to use cyclic carbonate and chained carbonate in a mixture thereof. In this case, the cyclic carbonate and the chained carbonate are mixed in a volume ratio of about 1:1 to about 1:9, so that the performance of the electrolyte can be excellently exhibited.

The non-aqueous organic solvent may further include an aromatic hydrocarbon-based organic solvent in addition to the carbonate-based solvent. Here, the carbonate-based solvent and the aromatic hydrocarbon-based organic solvent may be mixed at a volume ratio of about 1:1 to about 30:1.

As the aromatic hydrocarbon-based organic solvent, an aromatic hydrocarbon-based compound of the following Chemical Formula 1 may be used.

[Chemical Formula 1]

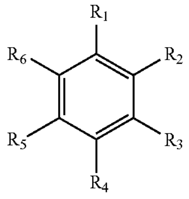

wherein in Chemical Formula 1, $R_1$ to $R_6$ are each independently hydrogen, halogen, a C1 to C10 alkyl group, a C1 to C10 haloalkyl group, or a combination thereof.

The aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodo benzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, to 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further contain vinylene carbonate or an ethylene carbonate-based compound of the following Chemical Formula 2 in order to improve the battery lifespan:

[Chemical Formula 2]

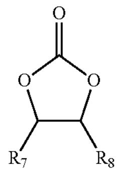

wherein in Chemical Formula 2, $R_7$ and $R_8$ are each independently hydrogen, a halogen group, a cyano group (CN), a nitro group ($NO_2$), or a C1-C5 fluoroalkyl group, and at least one of $R_7$ and $R_8$ is a halogen group, a cyano group (CN), a nitro group ($NO_2$), or a C1-C5 fluoroalkyl group.

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound are further used, the lifespan may be improved by appropriately controlling the use amounts thereof.

In the electrolyte solution of the lithium metal battery, the lithium salt is dissolved in the organic solvent to act as a lithium ion supply source in the battery, thereby enabling a basic operation of a lithium secondary battery and promoting the movement of lithium ions between a positive electrode and a negative electrode.

As the lithium salt, in general, a lithium salt widely applied to an electrolyte may be used. For example, the lithium salt may be a fluorine-containing lithium salt. More specifically, lithium bis(fluorosulfonyl)imide (LiFSI) may be used, and additionally, $LiPF_6$, $LiBF_4$, $LiSbF_6$, $LiAsF_6$, $LiC_4F_9SO_3$, $LiN(C_xF_{2x+1}SO_2)(C_yF_{2y+1}SO_2)$ (where x and y are natural numbers), or a combination thereof may be used.

Further, in the electrolyte solution, the concentration of the lithium salt may be controlled within the range of 0.1 to 5.0M. Within this range, the electrolyte may have an appropriate conductivity and viscosity, and lithium ions may effectively move in the lithium metal battery. However, this is merely an example, and the invention is not limited thereto.

The electrolyte may be in the form of being impregnated in a porous separator disposed between the negative electrode and the positive electrode. Here, the separator separates the positive electrode and the negative electrode, and provides a passage for lithium ions to move, and any separator may be used without limitation as long as it is generally used as a separator in a lithium secondary battery. That is, a separator having excellent moisture-retention ability for an electrolyte while having low resistance to the movement of electrolyte ions can be used.

However, as described above, a copper oxide layer may be formed on at least one surface of the porous separator, for example, on at least one surface in contact with the positive electrode.

Such a separator may be, for example, selected from glass fibers, polyester, Teflon, polyethylene, polypropylene, polytetrafluoroethylene (PTFE), or combinations thereof, and may be a non-woven fabric or a woven fabric. For example, a polyolefin-based polymer separator such as polyethylene, polypropylene, etc. is mainly used, and in order to secure heat resistance or mechanical strength, a coated separator containing a ceramic component or a polymer material may be used, and optionally, a single layer or a multilayer structure may be used.

Meanwhile, when the electrolyte of the lithium metal battery is a solid electrolyte, the solid electrolyte that can be used is not particularly limited.

Further, regardless of the electrolyte of the lithium metal battery, the positive electrode may include a positive electrode current collector and a positive electrode mixture layer (positive electrode active material layer) located on the positive electrode current collector. In addition, as already described above, a copper oxide layer may be coated and formed on one surface of the positive electrode active material layer in contact with the separator.

The positive electrode is manufactured by mixing an active material and a binder, optionally a conductive material, a filler, and the like in a solvent to produce an electrode mixture slurry, and then coating this electrode mixture slurry onto each negative electrode current collector. Since the above-mentioned electrode manufacturing method is widely known in the art, a detailed description thereof will be omitted herein.

In the case of the positive electrode active material, there is no particular limitation as long as it is a material capable of reversibly intercalating and de-intercalating lithium ions. For example, it may include one or more of complex oxides of cobalt, manganese, nickel, or a combination of metals; and lithium.

In a more specific example, a compound represented by any of the following chemical formulas can be used as the positive electrode active material. $Li_aA_{1-b}R_bD_2$ (wherein $0.90 \leq a \leq 1.8$ and $0 \leq b \leq 0.5$); $Li_aE_{1-b}R_bO_{2-c}D_c$ (wherein $0.90 \leq a \leq 1.8$, $0 \leq b \leq 0.5$, and $0 \leq c \leq 0.05$); $LiE_{2-b}R_bO_{4-c}D_c$ (wherein $0 \leq b \leq 0.5$, $0 \leq c \leq 0.05$); $Li_aNi_{1-b-c}Co_bR_cD_\alpha$ (wherein $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ (wherein $0.90 \leq a \leq 1.8$, $0 \leq b \leq 0.5$, $0 \leq c \leq 0.05$ and $0 \leq a \leq 2$); $Li_aNi_{1-b-c}Co_bR_cO_{2-\alpha}Z_2$ (wherein $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein $0.90 \leq a \leq 1.8$, $0 \leq b \leq 0.5$, $0 \leq c \leq 0.05$ and $0 < \alpha < 2$); $Li_aNi_bE_cG_dO_2$ (wherein $0.90 \leq a \leq 1.8$, $0 \leq b \leq 0.9$, $0 \leq c \leq 0.5$ and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$ and $0 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is Ni, Co, Mn or a combination thereof; R is Al, Ni, Co, Mn, Cr, Fe, Mg, Sr, V, a rare earth element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

Of course, it is also possible to use one having a coating layer on the surface of the above-mentioned compound, or it is possible to use a mixture of the above-mentioned compound with a compound having a coating layer. The coating layer may include a coating element compound such as coating element oxide, hydroxide, coating element oxy-hydroxide, coating element oxycarbonate or coating element hydroxycarbonate. The compounds forming these coating layers may be amorphous or crystalline. As a coating element included in the coating layer, Mg, Al, Co, K, Na, Ca, Si, Ti, V, Sn, Ge, Ga, B, As, Zr or a mixture thereof can be used. As the coating layer forming process, any coating method can be used as long as it can be coated by a method (e.g., spray coating or dipping method, etc.) that does not adversely affect the physical properties of the positive electrode active material by using these elements in the compound. Since this is a content that may be widely understood by those worked in the art, and thus, detailed descriptions thereof will be omitted.

The positive electrode current collector is typically fabricated to a thickness of 3 to 500 μm. The positive electrode current collector is not particularly limited as long as a corresponding battery has high conductivity without causing a chemical change in the battery, and for example, may be formed of stainless steel, aluminum, nickel, titanium, baked carbon, or aluminum, or a material formed by surface-treating a surface of stainless steel with carbon, nickel, titanium, silver, or the like. The current collector may have fine protrusions and depressions formed on a surface thereof to enhance adherence of a positive electrode active material, and may be formed in various forms such as a film, a sheet, a foil, a net, a porous body, a foaming body, and a non-woven fabric structure.

The conductive material is not particularly limited as long as a corresponding battery has high conductivity without causing a chemical change in the battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

Meanwhile, the negative electrode of the lithium metal battery described above may be a lithium metal negative electrode. The lithium metal negative electrode can be manufactured by depositing lithium metal on one or both surfaces of a planar negative electrode current collector or rolling a lithium foil according to the general configuration of a lithium metal battery. In this case, the negative electrode current collector may be, specifically, a copper foil.

The copper foil can generally be made to a thickness of 3 to 100 μm, and metal lithium formed on such a copper foil may be formed, for example, to a thickness of 1 to 300 μm.

Meanwhile, the lithium metal battery of the one embodiment may not only be used in a unit cell used as a power source for a small device, but also it can be used as a unit cell in a medium or large-sized battery module including a plurality of battery cells. Furthermore, a battery pack including the battery module may be configured.

Hereinafter, preferred examples of the present disclosure, comparative examples, and test examples for evaluating them are described. However, the following examples are only preferred examples of the present disclosure, and the present disclosure is not limited to the following examples.

Example 1: Manufacture of a Lithium Metal Battery in which a Copper Oxide Layer was Coated/Formed on One Surface of a Positive Electrode $LiNi_{0.5}Mn_{1.5}O_4$ as a positive electrode active material, Super P as a conductive material, and polyvinylidene fluoride (PVDF) as a binder were used, respectively, and the positive electrode active material: the conductive material: the binder were mixed at a weight ratio of 94:3:3 to form a mixture. NMP as a solvent was added to this mixture to prepare a positive electrode active material slurry. The positive electrode active material slurry was coated onto an aluminum foil (thickness: 10 μm) and dried at 120° C. for 30 minutes. Thereby, a positive electrode active material layer was formed.

Copper oxide and PVDF binder were mixed at a weight ratio of 9:1, dissolved in NMP, and then coated to a thickness of 3 μm onto one surface of the positive electrode, and dried at 120° C. for 30 minutes. Through this, a copper oxide layer was formed on the positive electrode surface.

The positive electrode thus prepared was punched into a diameter of 11 mm, and then dried under vacuum at 120° C. for 12 hours to produce a positive electrode.

A 2032 type coin cell was manufactured in a glove box under an argon atmosphere using the positive electrode and the lithium metal negative electrode. At this time, as the separator, a multilayer separator of PP/PE/PP was used, and a solution where 1.3 M $LiPF_6$ was dissolved in a mixed solvent of DMC, EMC, and DEC (30:20:50 in vol %) was used as the electrolyte solution, and was injected at 100 μL into the coin cell. Thereby, a lithium metal secondary battery of Example 1 was manufactured.

Example 2: Manufacture of a Lithium Metal Battery in which a Copper Oxide Layer was Coated/Formed on One Surface of a Separator A lithium metal secondary battery of Example 2 was manufactured in the same manner as in Example 1, except that the copper oxide and PVDF binder were mixed in a weight ratio of 9:1, and the solution dissolved in NMP was coated onto one surface of the multilayer separator of PP/PE/PP at a thickness of 3 μm instead of coating the solution onto the positive electrode surface, and dried at 80° C. for 1 hour.

Comparative Example 1: Manufacture of Lithium Metal Battery

A lithium metal secondary battery of Comparative Example 1 was manufactured in the same manner as in Example 1, except that the copper oxide layer was not formed.

Comparative Example 2: Preparation of a Lithium Metal Battery in which Copper Oxide was Formed as an Additive Inside the Positive Electrode $LiNi_{0.5}Mn_{1.5}O_4$ as a positive electrode active material, Super P as a conductive material, and polyvinylidene fluoride (PVDF) as a binder were used, respectively, and the positive electrode active material:the conductive material: the binder were mixed at a weight ratio of 94:3:3 to form a mixture. At this time, about 3 wt. % of copper oxide was added to the mixture, and mixed together. NMP as a solvent was added to this mixture to prepare a positive electrode active material slurry. The positive electrode active material slurry was coated onto an aluminum foil (thickness: 10 μm) and dried at 120° C. for 30 minutes. The positive electrode thus prepared was punched into a diameter of 11 mm, and then dried under vacuum at 120° C. for 12 hours to produce a positive electrode.

A 2032 type coin cell was produced in a glove box under an argon atmosphere using the positive electrode and the lithium metal negative electrode. At this time, as a separator, a multilayer separator of PP/PE/PP was used, and a solution where 1.3 M $LiPF_6$ was dissolved in a mixed solvent of DMC, EMC, and DEC (30:20:50 in vol %) was used as the electrolyte solution, and was injected at 100 μL into the coin cell. Thereby, a lithium metal secondary battery of Comparative Example 2 was manufactured.

Comparative Example 3: Manufacture of a Lithium Metal Battery in which a Silica Layer was Coated/Formed on One Surface of a Positive Electrode A lithium metal battery of Comparative Example 3 was manufactured in the same manner as in Example 1, except that silica was used instead of copper oxide to form a silica layer on one surface of the positive electrode.

Comparative Example 4: Manufacture of a Lithium Metal Battery in which a Silica Layer was Coated/Formed on One Surface of a Separator A lithium metal battery of Comparative Example 4 was manufactured in the same manner as in Example 2, except that silica is used instead of copper oxide to form a silica layer on one surface of the multilayer separator.

Experimental Example 1: Evaluation of Capacity Retention Rate of Secondary Battery Using the cells manufactured in Examples and Comparative Examples, first, charging and charging and discharging were performed three times at a current density of 12 $mA \cdot g^{-1}$. Thereafter, a constant current charge/discharge test was performed in the range of 3.5V to 4.9V. At this time, a charge/discharge test was performed at a current density of 120 $mA \cdot g^{-1}$ at 60° C., and the cycle in which the capacity-to-capacity retention rate at the time of initial charge/discharge was 80% was evaluated, and shown in Table 1 below.

Experimental Example 2: Evaluation of the Ability to Remove Water/Hydrofluoric Acid in the Cell In order to measure the amount of hydrofluoric acid and water generated during the charging/discharging process for the batteries manufactured in the Examples and Comparative Examples, a beaker type cell was prepared. The prepared cell was charged and discharged 50 times at a current density of 120 $mA \cdot g^{-1}$ at 60° C., and then about 1 g of the electrolyte was taken and the hydrofluoric acid and water contents in the electrolyte were measured. The hydrofluoric acid content was measured with an aqueous sodium hydroxide solution having a concentration of 0.01 N using an acid and base titrator, and the water content was measured using the Karl Fischer method.

These hydrofluoric acid and moisture contents are summarized and shown in Table 1 below.

TABLE 1

| | Capacity retention rate (80%) | Hydrofluoric acid content (ppm) | Water content (ppm) |
|---|---|---|---|
| Comparative Example 1 | 54 cycle | 1085 | 217 |
| Comparative Example 2 | 62 cycle | 836 | 189 |
| Comparative Example 3 | 61 cycle | 849 | 196 |
| Comparative Example 4 | 65 cycle | 821 | 177 |
| Example 1 | 73 cycle | 724 | 155 |
| Example 2 | 81 cycle | 715 | 148 |

Referring to Table 1, it was confirmed that when a copper oxide layer is formed on the positive electrode surface or the separator surface as in Examples 1 and 2, hydrofluoric acid and water inside the cell can be very effectively removed even when compared with Comparative Example 1 and further, Comparative Example 2 in which copper oxide was added to the inside of the positive electrode.

Further, it was confirmed that in Examples 1 and 2, hydrofluoric acid and water inside the cell can be very effectively removed, even when compared with Comparative Examples 3 and 4 using a silica layer instead of the copper oxide layer.

As a result, it was confirmed that the cell of Examples exhibited superior life characteristics compared to Comparative Example.

The invention claimed is:

1. A lithium metal battery comprising:

a positive electrode including a positive electrode current collector and a positive electrode active material layer disposed on the positive electrode current collector;

a negative electrode including a negative electrode current collector and a lithium metal thin film disposed on the negative electrode current collector;

a separator interposed between the positive electrode and the negative electrode; and an electrolyte, wherein the positive electrode and the separator are in contact with each other on at least one surface, the lithium metal battery further includes a copper oxide layer disposed between the positive electrode active material layer and the separator, the positive electrode active material layer includes a positive electrode active material, the copper oxide layer has a thickness of 1 to 10 μm, the positive electrode active material includes: one or more of complex oxides including a metal selected from the group consisting of cobalt, manganese, nickel, iron, and a combination thereof; and lithium, and the electrolyte includes a fluorine-containing lithium salt, and further includes a copper fluoride ($CuF_2$) or a hydrate thereof formed on the copper oxide layer.

2. The lithium metal battery according to claim 1, wherein the copper fluoride ($CuF_2$) or the hydrate thereof is formed by a reaction between the copper oxide layer, hydrofluoric acid formed by a reaction of the electrolyte and water, and water.

3. The lithium metal battery according to claim 1, wherein the electrolyte includes:

a lithium salt selected from the group consisting of lithium bis(fluorosulfonyl) imide (LiFSI), $LiPF_6$, $LiBF_4$, $LiSbF_6$, $LiAsF_6$, $LiC_4F_9SO_3$, $LiN(C_xF_{2x+1}SO_2)(CyF_{2y+1}SO_2)$ (wherein x and y are natural numbers) and a combination thereof; and an organic solvent.

4. The lithium metal battery according to claim 1, wherein the copper oxide layer further includes a polymer binder.

5. A device comprising the lithium metal battery according to claim 1.

6. The lithium metal battery according to claim 1, a copper oxide is the only oxide included in the copper oxide layer.

7. The lithium metal battery according to claim 1, wherein the copper oxide layer includes a copper oxide and a binder, and a weight ratio of the copper oxide to the binder is 9:1.

8. A method for manufacturing a lithium metal battery, comprising:

forming a positive electrode having a positive electrode active material layer formed on a positive electrode current collector;

forming a battery assembly including the positive electrode, a negative electrode containing a lithium metal thin film disposed on a negative electrode current collector, and a separator interposed between the positive electrode and the negative electrode;

injecting an electrolyte into the battery assembly, and forming a copper oxide layer between the positive electrode active material layer and the separator, wherein the copper oxide layer has a thickness of 1 to 10 μm, the positive electrode active material includes: one or more of complex oxides including a metal selected from the group consisting of cobalt, manganese, nickel, iron, and a combination thereof; and lithium, and the electrolyte includes a fluorine-containing lithium salt, and further includes a copper fluoride ($CuF_2$) or a hydrate thereof formed on the copper oxide layer.

9. The method for manufacturing a lithium metal battery according to claim 8, wherein the forming the copper oxide layer includes coating an organic solution containing copper oxide onto one surface of the positive electrode or one surface of the separator and drying it.

10. The method for manufacturing a lithium metal battery according to claim 9, wherein the organic solution further includes a polymer binder.

11. A lithium metal battery comprising:

a positive electrode including a positive electrode current collector and a positive electrode active material layer disposed on the positive electrode current collector;

a negative electrode consisting of a negative electrode current collector and a lithium metal thin film disposed on the negative electrode current collector;

a single layer separator interposed between the positive electrode and the negative electrode; and an electrolyte, wherein the positive electrode and the single layer separator are in contact with each other on at least one surface, the negative electrode and the single layer separator are in contact with each other on at least one surface, the lithium metal battery further includes a copper oxide layer disposed between the positive electrode active material layer and the single layer separator, the positive electrode active material layer includes a positive electrode active material, and the copper oxide layer has a thickness of 1 to 10 μm, and the electrolyte includes a fluorine-containing lithium salt.

* * * * *